Patented Mar. 7, 1933

1,900,449

UNITED STATES PATENT OFFICE

FRIEDRICH KROLLPFEIFFER, OF MARBURG-ON-THE-LAHN, GERMANY, ASSIGNOR TO WINTHROP CHEMICAL COMPANY, INC., OF NEW YORK, N. Y., A CORPORATION OF NEW YORK

PHARMACEUTICAL PREPARATION

No Drawing. Application filed February 12, 1930. Serial No. 427,946.

The present invention relates to new compositions of matter of alkali metal salts of 7-iodo-8-hydroxyquinoline-5-sulfonic acid.

Aqueous solutions of 7-iodo-8-hydroxyquinoline-5-sulfonic acid, when mixed with caustic alkali, alkali metal carbonates or alkali metal dicarbonates, and the aqueous solutions of the alkali metal salts of the said acid more or less split off free iodine when heated, the degree of splitting off iodine depending on the temperature. For example, a five per cent aqueous solution of the sodium salt of the 7-iodo-8-hydroxyquinoline-5-sulfonic acid splits off free iodine at a temperature below the boiling point of the solution. (See Claus & Baumann, Journal für praktische Chemie (2) 55, page 466).

For applying such solutions as medicines, especially for injection purposes, this behavoir is most disadvantageous, for example, when sterilizing these solutions.

In accordance with the present invention these drawbacks are overcome by the presence of an alkali metal salt of an aromatic hydroxy-sulfonic- or carboxylic acid in the aqueous solution of an alkali metal salt of the 7-iodo-8-hydroxyquinoline-5-sulfonic acid.

The process of manufacturing such solutions can be performed in the manner generally known per se, for example, by dissolving an aromatic hydroxy-sulfonic- or carboxylic acid or their alkali metal salts in the aqueous solution of an alkali metal salt of the 7-iodo-8-hydroxyquinoline-5-sulfonic acid, whereby it is necessary in the former case, to add a caustic alkali, an alkali metal carbonate or bicarbonate. Furthermore, there can be made first a solid mixture of the 7-iodo-8-hydroxyquinoline-5-sulfonic acid or of its alkali metal salts with the aromatic hydroxysulfonic- or carboxylic acids or their alkali metal salts, whereby a caustic alkali or an alkali carbonate or bicarbonate for neutralizing the acids is added, if necessary, which mixtures then can be dissolved in water at any desired time.

From the above it results that for the therapeutical application of my compositions of matter only the alkali metal salts of the components are operable, but as already mentioned above, the preparations obtained by mixing the free acids with a caustic alkali, an alkali metal carbonate or bicarbonate yield when dissolved in water the alkali metal salts of the components. Such preparations are to be considered equivalent to the preparations obtained from the alkali metal salts of the components themselves.

Therefore, my invention is intended to include (1) The solutions of the alkali metal salts of 7-iodo-8-hydroxyquinoline-5-sulfonic acid and an aromatic hydroxy sulfonic- or carboxylic acid, (2) The solid mixtures of the alkali metal salts of 7-iodo-8-hydroxyquinoline-5-sulfonic acid and an aromatic hydroxy sulfonic or carboxylic acid, (3) The solid mixtures of the 7-iodo-8-hydroxyquinoline-5-sulfonic acid with an aromatic hydroxy-sulfonic- or carboxylic acid and a caustic alkali, an alkali carbonate- or bicarbonate.

As aromatic hydroxysulfonic- and carboxylic acids, compounds of the most various kind have proved useful. For example, from the benzene series 3.4.5.-trihydroxyphenylcarboxylic acid, parahydroxyphenyl - sulfonic acid; 1.2-dihydroxyphenyl-3.5-disulfonic acid, from the naphthalene series β-naphthol-disulfonic acid have proved useful. Also aromatic hydroxysulfonic- or carboxylic acids the aromatic nucleus of which is condensed with a heterocyclic nucleus can be applied, for example, hydroxyquinolinecarboxylic acids and hydroxyquinoline sulfonic acids, and, therefore, also such acids are intended to be included in the term aromatic "hydroxy - carboxylic- or sulfonic acids." I especially prefer, when producing the new preparations, the 8-hydroxy-quinoline-5-sulfonic acid. Mixtures of the 7-iodo-8-hydroxyquinoline-5-sulfonic acid with the 8-hydroxyquinoline-5-sulfonic acid of the desired composition are preferably directly produced in the process of the manufacture of the former by applying a less amount of iodine than calculated for a complete transformation of 8-hydroxyquinoline-5-sulfonic acid into its 7-iodo compound, whereby the free acids obtained may be directly transformed into the corresponding alkali metal salts in the usual manner or can be mixed with a caustic alkali, an alkali metal carbonate or bicarbonate at least sufficient for neutralizing the acid groups.

The proportions by weight of the components applied to each other may vary within wide limits, since the ratio of the thermostability of the aqueous solutions depends on the character of the aromatic hydroxy-sulfonic- or carboxylic acid used, and is raised by the application of a larger amount of the aromatic hydroxy-sulfonic- or carboxylic acid. Generally aqueous solutions of mixtures containing about 10% of the aromatic hydroxy-sulfonic- or carboxylic acid calculated upon the amount of the 7-iodo-8-hydroxyquinoline-5-sulfonic acid possess a practically sufficient thermostability, but also mixtures containing more or less than 10% of the stated acids have proved useful. For example, when applying 8-hydroxyquinoline-5-sulfonic acid as stabilizer we prefer to use 2–10 parts by weight of the latter for 100 parts by weight of 7-iodo-8-hydroxyquinoline-5-sulfonic acid. Likewise the amount of the alkali metal compounds to be used is not limited to the quantity necessary for neutralizing the sulfonic or carboxylic acid groups, but a small excess does not exert any harmful effect on the preparations and on their applicability for pharmaceutical purposes.

The solid mixtures obtainable according to the described processes are yellow powders, soluble in water. The aqueous solutions of the mixtures have a dark-yellow coloration and distinguish from the aqueous solutions of alkali metal salts of the 7-iodo-8-hydroxyquinoline-5-sulfonic acid by their considerable better stability on heating; they are valuable medicines especially for injection purposes. The solid mixtures are tabletable and can easily be dosed and packed.

The following examples serve to illustrate my invention, without limiting it thereto:—

*Example 1.*—68 parts by weight of 7-iodo-8-hydroxyquinoline-5-sulfonic acid are mixed with 10 parts by weight of 8-hydroxyquinoline-5-sulfonic acid and 22 parts by weight of sodium bicarbonate. A five per cent aqueous solution of this mixture prepared by weakly heating does not split off free iodine after boiling for 3 hours while the 5 per cent solution of a mixture of 78 parts by weight of 7-iodo-8-hydroxyquinoline-5-sulfonic acid with 22 parts by weight of sodium bicarbonate splits off iodine after boiling for one and a half minutes causing thereby a dark coloration of the solution.

Instead of sodium bicarbonate, about equivalent amounts of a caustic alkali or an alkali metal carbonate can be applied.

*Example 2.*—A mixture of 75 parts by weight of 7-iodo-8-hydroxyquinoline-5-sulfonic acid and 3 parts by weight of 8-hydroxyquinoline-5-sulfonic acid obtained by iodizing the latter is mixed with 22 parts by weight of sodium bicarbonate. A five per cent aqueous solution of this preparation begins to split off free iodine after boiling for 15 minutes.

*Example 3.*—68 parts by weight of 7-iodo-8-hydroxyquinoline-5-sulfonic acid are mixed with 10 parts by weight of the sodium salt of paraphenolsulfonic acid and 22 parts by weight of sodium bicarbonate. A five per cent aqueous solution of this preparation splits off free iodine after boiling during 10 minutes, without causing the dark coloration which occurs when boiling the solution of the sodium salt of the iodized acid without the addition of the salt of the paraphenol sulfonic acid.

*Example 4.*—75 parts by weight of 7-iodo-8-hydroxyquinoline-5-sulfonic acid are mixed with 3 parts by weight of the sodium salt of β-naphthol-bisulfonic acid and 22 parts by weight of sodium bicarbonate. A five per cent aqueous solution of this mixture splits off free iodine after boiling during 11 minutes.

*Example 5.*—17 parts by weight of 7-iodo-8-hydroxyquinoline-5-sulfonic acid are mixed with 2.5 parts by weight of gallic acid and 5.5 parts by weight of sodium bicarbonate. A five per cent aqueous solution of this mixture does not split off free iodine after boiling during 35 minutes.

*Example 6.*—17 parts by weight of 7-iodo-8-hydroxyquinoline-5-sulfonic acid are mixed with 2.5 parts by weight of 4.5.6-trihydroxyphenyl-1.3-dicarboxylic acid and 5.5 parts by weight of sodium bicarbonate. A five per cent aqueous solution begins to split off free iodine after boiling during 14 minutes.

*Example 7.*—A solution of 2.5 parts by weight of the potassium salt of 1.2 dihydroxyphenyl-3.5-disulfonic acid in 460 parts by weight of water is mixed with 17 parts by weight of 7-iodo-8-hydroxyquinoline-5-sulfonic acid and 3.6 parts by weight of potassium carbonate. The solution obtained begins to split off free iodine after boiling for 8–9 minutes.

As mentioned in Example 1, the aqueous solutions of 7-iodo-8-hydroxyquinoline-5-sulfonic acid split off iodine already after boiling for about 1–2 minutes. From this clearly results the greater stability of my new compositions.

I claim:—

1. Composition of matter comprising 100 parts by weight of 7-iodo-8-hydroxyquinoline-5-sulfonic acid, 2–10 parts by weight of 8-hydroxyquinoline-5-sulfonic acid and about 30 parts by weight of sodium bicarbonate, said composition of matter being a yellow powder soluble in water which solutions show a great stability when heated and are valuable for pharmaceutical purposes.

2. A composition of matter comprising an alkali metal salt of 7-iodo-8-hydroxyquinoline-5-sulfonic acid and an alkali metal salt of an acid of an organic cyclic compound of the group consisting of hydroxy-sulfonic and hydroxy carboxylic acids of the aromatic and aromatic-heterocyclic series, said composition of matter being a yellow powder soluble in water, showing in form of its solution a great stability against heat, and being valuable for pharmaceutical purposes.

3. A composition of matter comprising an alkali metal salt of 7-iodo-8-hydroxyquinoline-5-sulfonic acid, an alkali metal salt of an acid of an organic cyclic compound of the group consisting of hydroxy-sulfonic and hydroxy carboxylic acids of the aromatic and aromatic-heterocyclic series, and an alkaline alkali metal compound of the group consisting of alkali metal hydroxides, alkali metal carbonates and alkali metal bicarbonates, said composition of matter being a yellow powder soluble in water, showing in form of its solution a great stability against heat, and being valuable for pharmaceutical purposes.

4. A composition of matter comprising in alkali metal salt of 7-iodo-8-hydroxyquinoline-5-sulfonic acid and an alkali metal salt of an aromatic-heterocyclic acid of the group consisting of the hydroxy sulfonic and hydroxy carboxylic acids, said composition of matter being a yellow powder soluble in water, showing in form of its solution a great stability against heat, and being valuable for pharmaceutical purposes.

5. A composition of matter comprising an alkali metal salt of 7-iodo-8-hydroxyquinoline-5-sulfonic acid, an alkali metal salt of an aromatic-heterocyclic acid of the group consisting of the hydroxy sulfonic and hydroxy carboxylic acids, and an alkaline alkali metal compound of the group consisting of alkali metal hydroxides, alkali metal carbonates and alkali metal bicarbonates, said composition of matter being a yellow powder soluble in water, showing in form of its solution a great stability against heat, and being valuable for pharmaceutical purposes.

6. A composition of matter comprising an alkali metal salt of 7-iodo-8-hydroxyquinoline-5-sulfonic acid, an alkali metal salt of 8-hydroxyquinoline-5-sulfonic acid, and an alkali metal bicarbonate, said composition of matter being a yellow powder soluble in water, showing in form of its solution a great stability against heat, and being valuable for pharmaceutical purposes.

7. A composition of matter comprising an alkali metal salt of 7-iodo-8-hydroxyquinoline-5-sulfonic acid, an alkali metal salt of an aromatic acid of the group consisting of the hydroxy sulfonic and hydroxy carboxylic acids, and an alkaline alkali metal compound of the group consisting of alkali metal hydroxides, alkali metal carbonates and alkali metal bicarbonates, said composition of matter being yellow powders soluble in water, showing in form of its solution a great stability against heat, and being valuable for pharmaceutical purposes.

In testimony whereof, I affix my signature.

FRIEDRICH KROLLPFEIFFER.